US011865388B2

(12) United States Patent
Dibble

(10) Patent No.: US 11,865,388 B2
(45) Date of Patent: Jan. 9, 2024

(54) SYSTEMS AND METHODS FOR FIRE SUPPRESSION IN A CORRIDOR

(71) Applicant: Tyco Fire Products LP, Lansdale, PA (US)

(72) Inventor: Bonnie H. Dibble, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 17/882,197

(22) Filed: Aug. 5, 2022

(65) Prior Publication Data

US 2022/0379150 A1 Dec. 1, 2022

Related U.S. Application Data

(63) Continuation of application No. 17/078,486, filed on Oct. 23, 2020, now Pat. No. 11,439,857.

(60) Provisional application No. 62/925,850, filed on Oct. 25, 2019.

(51) Int. Cl.
*A62C 37/12* (2006.01)

(52) U.S. Cl.
CPC .................................... *A62C 37/12* (2013.01)

(58) Field of Classification Search
CPC .............. A62C 37/12; A62C 37/11–16; B05B 1/268–267
See application file for complete search history.

(56) References Cited

U.S. PATENT DOCUMENTS

| | | | | | |
|---|---|---|---|---|---|
| 2,135,138 | A * | 11/1938 | Kendall | B05B 1/265 239/DIG. 1 |
| 4,585,069 | A * | 4/1986 | Whitaker | B05B 1/262 239/524 |
| 5,669,449 | A * | 9/1997 | Polan | A62C 37/08 169/37 |
| 5,839,667 | A * | 11/1998 | Fishcer | A62C 31/02 169/37 |
| 7,275,603 | B2 * | 10/2007 | Polan | A62C 37/09 169/41 |
| 8,800,673 | B2 * | 8/2014 | Multer | A62C 35/58 239/524 |
| 8,973,669 | B2 * | 3/2015 | Connery | A62C 37/14 169/17 |
| 9,149,818 | B1 * | 10/2015 | Orr | B05B 1/267 |
| 9,717,936 | B2 * | 8/2017 | Ancone | A62C 35/68 |
| 9,717,937 | B2 * | 8/2017 | Miller | A62C 35/68 |
| 9,827,455 | B1 * | 11/2017 | Tapia Negrete | A62C 37/14 |

(Continued)

*Primary Examiner* — Joseph A Greenlund
(74) *Attorney, Agent, or Firm* — Foley & Lardner LLP

(57) ABSTRACT

A corridor sprinkler includes a frame, a seal, a thermally-responsive trigger, and a deflector. The frame defines a passageway between an inlet and an outlet along a longitudinal axis, the passageway having a nominal K-factor greater than or equal to 8.0. The seal is coupled with the outlet to prevent fluid flow out of the passageway while the seal is in an unactuated state. The thermally-responsive trigger changes the seal from the unactuated state to an actuated state to allow fluid to flow out of the passageway. The deflector is coupled with the frame and distributes fluid received at the inlet at a pressure of between 8 psi and 250 psi and through the passageway to provide a coverage area of between 220 square feet and 400 square feet and a polygonal spray pattern with a long axis length of between 28 feet to 36 feet.

20 Claims, 8 Drawing Sheets

(56) References Cited

U.S. PATENT DOCUMENTS

| | | | | |
|---|---|---|---|---|
| 10,099,080 | B2 * | 10/2018 | Miller | A62C 35/62 |
| 10,426,984 | B2 * | 10/2019 | Pipe | B05B 1/265 |
| 10,661,107 | B2 * | 5/2020 | Workman | A62C 35/60 |
| 11,065,487 | B2 * | 7/2021 | Miller | A62C 35/62 |
| 11,213,707 | B2 * | 1/2022 | Wancho | B05B 1/265 |
| 11,219,790 | B2 * | 1/2022 | Jimenez | A62C 31/02 |
| 11,439,857 | B2 * | 9/2022 | Dibble | B05B 1/267 |
| 2003/0079889 | A1 * | 5/2003 | Meyer | A62C 37/11 169/41 |
| 2003/0222155 | A1 * | 12/2003 | Neil | A62C 31/02 239/208 |
| 2006/0102362 | A1 * | 5/2006 | S. Polan | A62C 37/09 169/37 |
| 2007/0246231 | A1 * | 10/2007 | Pahila | A62C 35/68 169/37 |
| 2008/0011491 | A1 * | 1/2008 | Thau | A62C 31/02 239/597 |
| 2009/0126950 | A1 * | 5/2009 | Rogers | A62C 35/68 169/37 |
| 2010/0263883 | A1 * | 10/2010 | Abels | A62C 31/02 169/37 |
| 2010/0276164 | A1 * | 11/2010 | Feenstra | A62C 37/11 169/37 |
| 2011/0127050 | A1 * | 6/2011 | Pahila | A62C 35/68 169/37 |
| 2011/0180277 | A1 * | 7/2011 | Jimenez | A62C 37/09 169/37 |
| 2011/0315406 | A1 * | 12/2011 | Connery | A62C 99/0072 169/37 |
| 2013/0043050 | A1 * | 2/2013 | Barmoav | A62C 31/02 169/37 |
| 2014/0102729 | A1 * | 4/2014 | Ringer | A62C 37/12 169/17 |
| 2014/0174765 | A1 * | 6/2014 | Miller | B05B 1/265 169/37 |
| 2014/0262357 | A1 * | 9/2014 | Ringer | A62C 37/11 169/37 |
| 2015/0122513 | A1 * | 5/2015 | Miller | A62C 35/62 169/37 |
| 2015/0297927 | A1 * | 10/2015 | Pipe | A62C 37/14 169/37 |
| 2015/0343474 | A1 * | 12/2015 | Connery | B05B 15/16 427/282 |
| 2017/0296852 | A1 * | 10/2017 | Pipe | A62C 35/68 |
| 2019/0022442 | A1 * | 1/2019 | Jimenez | A62C 37/08 |
| 2019/0143162 | A1 * | 5/2019 | Silva, Jr. | A62C 35/68 169/70 |
| 2019/0184411 | A1 * | 6/2019 | Silva, Jr. | B05B 1/267 |
| 2020/0054904 | A1 * | 2/2020 | Workman | A62C 37/11 |
| 2021/0121722 | A1 * | 4/2021 | Dibble | B05B 1/267 |
| 2021/0244985 | A1 * | 8/2021 | Oldham | B05B 15/16 |

* cited by examiner

SYSTEMS AND METHODS FOR FIRE SUPPRESSION IN A CORRIDOR

CROSS-REFERENCE TO RELATED APPLICATIONS

The present application is a continuation of U.S. patent application Ser. No. 17/078,486, filed Oct. 23, 2020, which claims the benefit of and priority to U.S. Provisional Application No. 62/925,850, titled "SYSTEMS AND METHODS FOR FIRE SUPPRESSION IN A CORRIDOR," filed Oct. 25, 2019, the disclosures of which are incorporated herein by reference in their entireties.

BACKGROUND

Sprinkler devices can be used to distribute a fire suppression material in a spray pattern. For example, sprinkler devices can receive the fire suppression material as one or more fluids from a fluid supply and distribute the fire suppression material responsive to a fire condition.

SUMMARY

At least one aspect relates to a corridor sprinkler. The corridor sprinkler can include a frame, a seal, a thermally-responsive trigger, and a deflector. The frame defines a passageway between an inlet and an outlet along a longitudinal axis, the passageway having a nominal K-factor greater than or equal to 8.0. The seal is coupled with the outlet to prevent fluid flow out of the passageway while the seal is in an unactuated state. The thermally-responsive trigger changes the seal from the unactuated state to an actuated state to allow fluid to flow out of the passageway. The deflector is coupled with the frame and distributes fluid received at the inlet at a pressure of between 8 psi and 250 psi and through the passageway to provide a coverage area of between 220 square feet and 400 square feet and a polygonal spray pattern with a long axis length of between 28 feet to 36 feet.

At least one aspect relates to a deflector. The deflector can include a first side, a second side, a third side, and a fourth side. The first side and the second side are smaller than the third side and the fourth side. The first side and the second side include an end profile defining a first tine separated from a second tine by a first slot, a third tine separated from the second tine by a second slot, and a fourth tine separated from the third tine by a third slot. A first depth of the first slot is greater than a second depth of the second slot.

At least one aspect relates to a fire suppression system. The fire suppression system can include a fire suppression material source storing a fire suppression material, at least one fire protection sprinkler, and a piping system. The at least fire protection sprinkler includes a frame, a seal, a thermally-responsive trigger, and a deflector. The frame defines a passageway between an inlet and an outlet along a longitudinal axis, the passageway having a nominal K-factor greater than or equal to 8.0. The seal is coupled with the outlet to prevent fluid flow out of the passageway while the seal is in an unactuated state. The thermally-responsive trigger changes the seal from the unactuated state to an actuated state to allow fluid to flow out of the passageway. The deflector is coupled with the frame and distributes fluid received at the inlet at a pressure of between 8 psi and 250 psi and through the passageway to provide a coverage area of between 220 square feet and 400 square feet and a polygonal spray pattern with a long axis length of between 28 feet to 36 feet. The piping system transmits the fire suppression material from the fire suppression material source to each fire protection sprinkler.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

The present disclosure relates generally to fire suppression systems. More specifically, the present disclosure relates to fire suppression systems that use sprinklers to distribute water in a spray pattern.

Following below are more detailed descriptions of various concepts related to, and implementations of sprinklers in fire suppression systems and methods. Sprinklers are used to distribute, in an environment, a fire suppression material (e.g., water) provided by a fire suppression material source. Some sprinklers include a deflector that, upon striking the deflector, spreads water in a spray pattern. The spray pattern can be correspond to interaction of the water with an array of tines and slots of the deflector. The slots include spaces which allow water to spread below sprinkler and throughout a region proximate the sprinkler. The tines include physical extensions that extend outwards from the deflector that can spread the water beyond the region proximate the sprinkler. The shape, size, configuration, number, etc. of the tines and slots can be designed to influence a particular spray pattern. The tines and slots can be shaped and sized to define a spray pattern that corresponds to a particular room shape. Some corridor spaces (e.g., hallways, vestibules) define a long, rectangular shape that includes a first pair of parallel walls that are longer than a second pair of parallel walls situated perpendicular to the first pair of parallel walls. It can be difficult to ensure that sprinklers properly output sufficient fluid throughout an extent of such spaces (including to ensure that walls of the spaces receive sufficient fluid).

Systems and methods in accordance with sprinkler deflectors as described herein can enable a spray pattern to effectively address a fire in such spaces.

Figure 1:
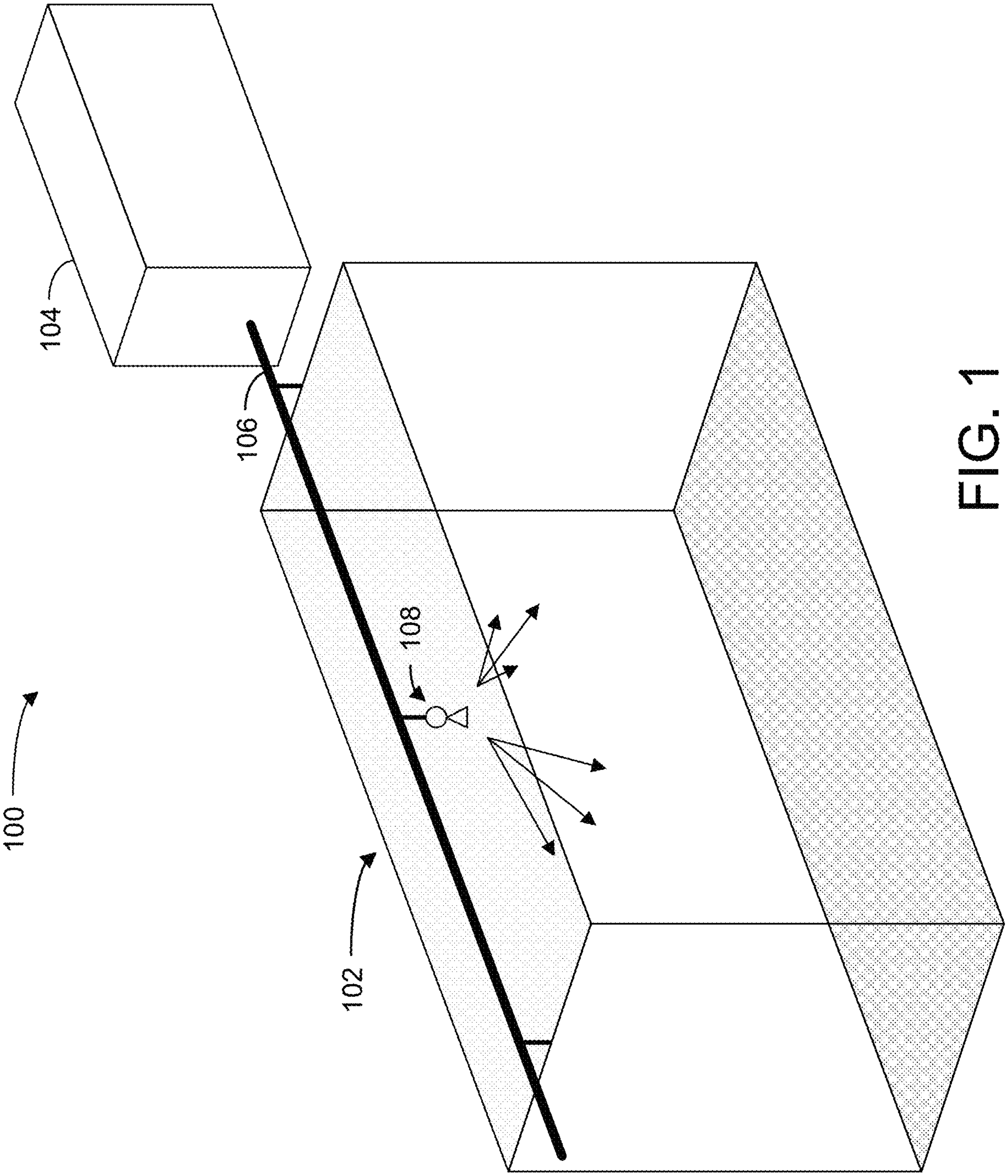
FIG. 1 is a schematic diagram depicting a corridor in which a corridor sprinkler is installed.

FIG. 1 depicts a fire suppression system 100. The fire suppression system 100 provides a fire suppression material to at least a corridor 102 upon activation of the fire suppression system 100. Such an activation may be caused by an elevated temperature which may be generated by a fire occurring in an interior of corridor 102. The fire suppression material that is provided to corridor 102 can be stored in a fire suppression material source 104 (e.g., fluid source), transported through a piping system 106 to one or more sprinklers 108 (e.g., corridor fire sprinklers 108), and expelled out of the one or more sprinklers 108 to the interior of corridor 102. Corridor 102 can be, in general, a zone (e.g., a room, a space) within a building or structure having two walls extending parallel to and separated from one another such that a length of each of the two walls is greater than the distance separating the two walls. For example, corridor 102 may be a hallway, a vestibule, a stairwell. FIG. 1 depicts fire suppression system 100 implemented with a single corridor 102; fire suppression system 100 may provide fire suppression material to one or more other zones (e.g., corridors, rooms, offices).

Fire suppression material source 104 can be a tank, container, reservoir, storage chamber, or a receptacle structured to store a fire suppression material therein. Such a fire suppression material can include water, a gas, a foam, etc. Fire suppression material source 104 can store the fire suppression material until activation of the fire suppression system 100. As such, fire suppression material source 104 can include any components that restrict the flow of fire suppression material until activation of the fire suppression system 100 and sequentially allows the flow of fire suppression material out of the fire suppression material source 104 upon activation of the fire suppression system 100. Fire suppression material may be stored in both piping system 106 and fire suppression material source 104 such that fire suppression material source 104 does not provide components to restrict the flow of fire suppression material out of fire suppression material source 104. In this regard, the one or more corridor fire sprinklers 108 may each include a component (e.g., a stopper, a plug, a valve) that restricts the flow of fire suppression material out of each The sprinkler 108 until activation of the fire suppression system 100.

Piping system 106 can include any number of conduits, paths, connectors, etc. to facilitate the flow of fire suppression material from fire suppression material source 104 to one or more corridor fire sprinklers 108. Piping system 106 can be made of any material such as a metal or a plastic. Piping system 106 includes a first end that is coupled to fire suppression material source 104 and one or more outlets that each couple to The sprinkler 108. In general, the piping system 106 defines a channel that transmits the fire suppression material from fire suppression material source 104 to one or more corridor fire sprinklers 108.

As will be described in greater detail with reference to FIGS. 2-7, The sprinkler 108 can facilitate the spread of fire suppression material in a spray pattern that is adapted for corridor 102. The spray pattern can define a polygonal shape (e.g., a shape in which edges between four outermost corner points form four angles at the corner points, each of which are within a threshold angle of perpendicular, the threshold angle being no greater than ten degrees, no greater than five degrees, or no greater than one degree) and can be facilitated by one or more tines and one or more slots provided by a deflector of the corridor fire sprinkler. The sprinkler 108 can a be pendent-style fire sprinkler that can hang from a ceiling and couple to piping system 106.

Figure 2:
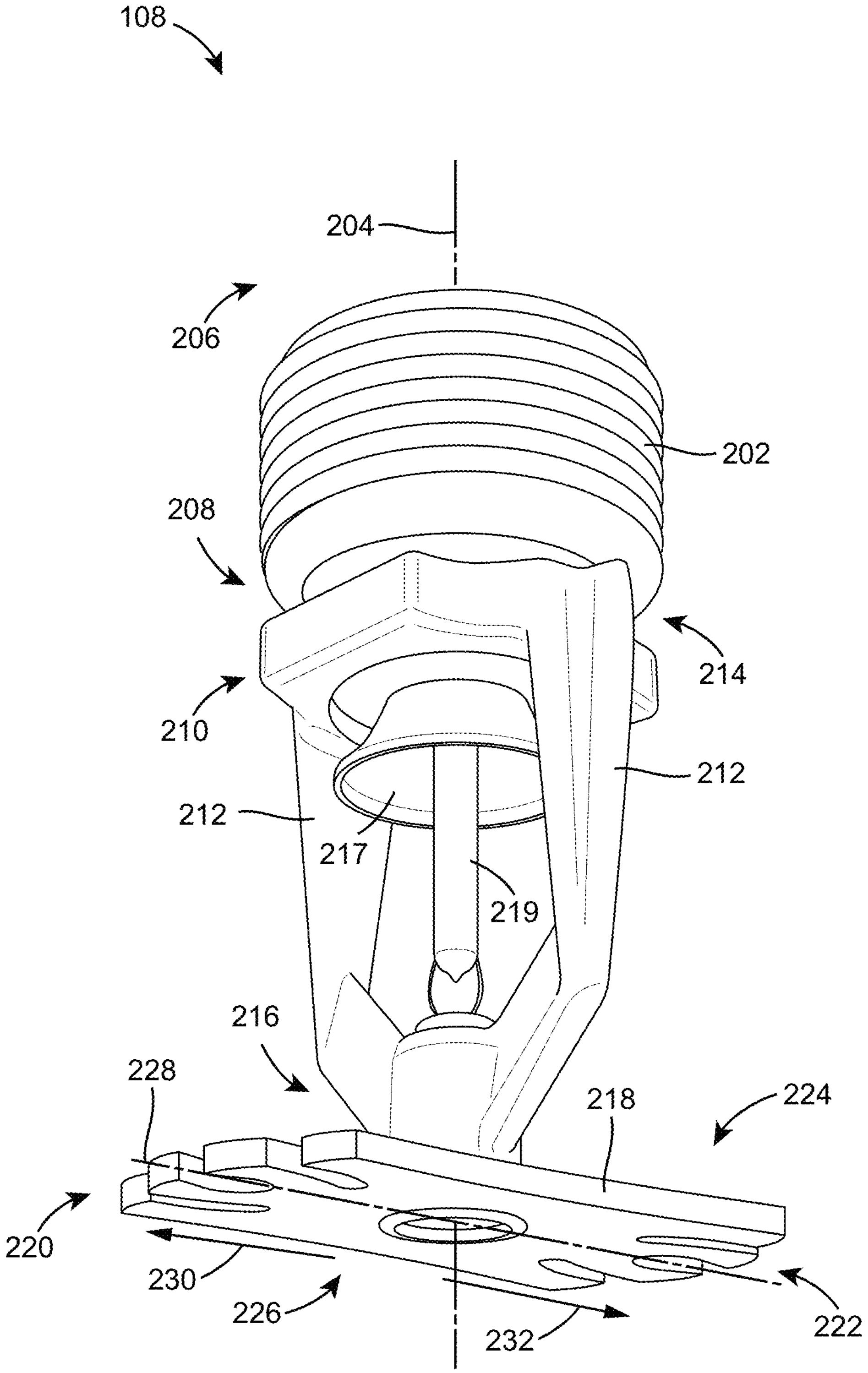
FIG. 2 is a schematic diagram depicting a corridor sprinkler.

FIG. 2 depicts an example of the sprinkler 108. The sprinkler 108 can provide a fluid distribution or spray pattern of fire suppression material that is suitable for corridors. The spray patterns and fluid distribution devices described herein can meet requirements such as wall wetting, impingement, fire testing guidelines and all other requirements of UL-199 for Extended Coverage Light Hazard (ECLH), and applicable sections of NFPA 13. The deflector 218 of sprinkler 108 can enable the spray pattern using a non-uniform design of tines and slots. More specifically, the non-uniform design may correspond to a non-uniform width of the slot or the tine.

The sprinkler 108 can include a sprinkler frame 202 (e.g., a body) for coupling the sprinkler 108 to a fire suppression material supply pipe. The outside surface of the sprinkler frame 202 can include, for example, a threaded structure for engagement with a correspondingly threaded pipe fitting, or the outside surface can be tapered for a welded or soldered connection to the pipe fitting. The sprinkler frame 202 can be sized to be mounted with a recess (not depicted) within a wall, ceiling, or other structure, the recess having a size of between 0 inch to 0.75 inch. The sprinkler frame 202 can be mounted within an unvented escutcheon. The sprinkler frame 202 can include a passageway (e.g., internal channel, not shown) extending along a longitudinal axis 204 (e.g., sprinkler axis) and between an inlet 206 (which defines an inlet opening into the internal channel) and an outlet 208 (which defines an outlet opening from the internal channel), such that fluid received in the inlet 206 can pass through the passageway to be outputted from the outlet 208.

Discharge characteristics of a sprinkler can be quantified by a nominal K-factor of a sprinkler, which is defined as an average flow of water in gallons per minute through the internal channel divided by a square root of pressure of water fed into the inlet of the channel in pounds per square inch gauge. The K-factor of a sprinkler can be calculated with the following equation:

$$K = \frac{Q}{\sqrt{P}}$$

where P represents the pressure of water fed into the inlet of the internal channel and through the sprinkler frame in pounds per square inch (psig); Q represents the flow of water from the outlet of the internal channel through the sprinkler frame in gallons per minute (gpm); and K represents the nominal K-factor constant in units of gallons per minute divided by the square root of pressure in psig ($GPM/PSI^{1/2}$).

The sprinkler 108 can have a nominal K-factor ranging from 6 to 10 $GPM/(PSI)^{1/2}$. The sprinkler 108 can have a nominal K-factor of 8 $GPM/(PSI)^{1/2}$. The sprinkler 108 can have a K-factor ranging from 7.4 to 8.2 $GPM/(PSI)^{1/2}$ for a nominal K-factor of 8 $GPM/(PSI)^{1/2}$. The sprinkler 108 can be of any nominal K-factor provided sprinkler frame 202 can deliver fire suppression material for distribution in a spray pattern as described herein. The sprinkler 108 can have an operating pressure of between 8 psi and 250 psi. The sprinkler 108 can have a minimum operating pressure of less than 15 psi, such as from 5 psi to 11 psi, and such as 8.3 psi.

The sprinkler 108 can include a mount 210. The mount 210 can extend from the sprinkler frame 202. The mount 210 can include a pair of support arms 212 extending outward from the sprinkler axis 204 from a first end 214 coupled to the sprinkler frame 202 towards a second end 216. The pair of support arms 212 can converge at the second end 216 to couple with a deflector 218. A deflector 218 can be coupled with the mount 210, such as by being fastened with or integrally formed with the mount 210, at the second end 216, thereby supporting the deflector 218 and spacing the deflector 218 axially away (e.g., along sprinkler axis 204) from the outlet 208 of the sprinkler frame 202.

The sprinkler 108 can be an automatic sprinkler having fire suppression material discharge from the sprinkler frame 202 controlled by a thermally-responsive trigger 219. The thermally-responsive trigger 219 can be a bulb-type trigger (e.g., a glass bulb in which fluid is held that expands responsive to heat to cause the bulb to break at a threshold temperature). The thermally-responsive trigger 219 can include a thermally-responsive solder element (e.g., a strut, lever, and solder link assembly). An example of a bulb-type trigger assembly for thermal operation of the sprinkler 108 is a "quick response" trigger thermally rated at 155 or 200° F.

Upon actuation of the thermally-responsive trigger 219, the sprinkler 108 can distribute a fire suppression material in accordance with the spray pattern disclosed herein. For example, the sprinkler 108 can include a seal 217 (e.g., sprinkler button) coupled with the outlet 208 of the sprinkler frame 202. The thermally-responsive trigger 219 can apply a force against the seal 217 to hold the seal 217 in the outlet 208 (e.g., against pressure from fluid in the passageway of the sprinkler frame 202 between the inlet 206 and the outlet 208), which can define an unactuated state of the seal 217. Responsive to actuation of the thermally-responsive trigger 219 (e.g., responsive to at least one of temperature or heat around the thermally-responsive trigger 219 meeting or exceeding a respective threshold to cause the thermally-responsive trigger 219 to activate, such as to cause a glass bulb to break or solder to melt), the force applied by the thermally-responsive trigger 219 can decrease or discontinue, such as by the thermally-responsive trigger 219 moving away from the seal 217, such that the pressure from the fluid in the passageway moves the seal 217 out of the outlet 208 to allow the fluid to flow out of the outlet 208 and towards a deflector 218 (which can define an actuated state of the seal 217).

The deflector 218 can be disposed beneath the sprinkler frame 202 and coupled with the second end 216 of the mount 210. The deflector 218 can be disposed in a deflector plane that is beneath the sprinkler frame 202 and perpendicular to the sprinkler axis 204. The deflector 218 can be defined by a planar structure having a rectangular shape.

The deflector 218 includes a first side 220, a second side 222, a third side 224, and a fourth side 226. The first side 220 and the second side 222 can each include a length than is smaller than a length provided by each of the third side 224 and the fourth side 226. The third side 224 and the fourth side 226 can each extend along a deflector axis 228 that defines a centerline which intersects the first side 220 extending in a first direction 230 and intersects the second side 222 extending in a second direction 232 that is opposite the first direction 230. The first side 220 can extend from the third side 224 and the fourth side 226 in the first direction 230. The second side 222 can extend from the third side 224 and the fourth side 226 in the second direction 232. The first side 220 and the second side 222 can each have an end profile.

The end profile of the first side 220 and the second side 222 can facilitate the polygonal spray pattern that extends outward from the sprinkler axis 204 in the direction of the deflector axis 228. The spray pattern may extend outward from the first side 220 and the second side 222 and defining a long axis length (measured outward from the sprinkler axis 204 from the first side 220 and the second side 222 in a direction defined by the deflector axis 228) of between 28 feet to 36 feet. The spray pattern may extend outward from the third side 224 and the fourth side 226 in a direction perpendicular to the deflector axis 228 and defining a short axis length (measured outward from the sprinkler axis 204 from the third side 224 and the fourth side 226 in a direction perpendicular to the deflector axis 228, such that the long axis length is defined perpendicular to the short axis length) of between 8 to 24 feet. The spray pattern can provider a cover area of between 220 square feet and 400 square feet. The coverage area can be determined using the following equation:

$$A=S*L$$

In the previous equation, A is the coverage area, S is the S-dimension of one or more sprinklers located on a branch of sprinklers, and L is the L-dimension between one or more branches of sprinklers. The S-dimension can be determined by measuring the distance between a first, upstream sprinkler and a second, downstream sprinkler relative the first sprinkler, measuring the distance between a wall or obstruction and a sprinkler that is located at the end of a branch of sprinklers, and defining the value of the S-dimension as the larger of either twice the distance of the end sprinkler and the wall or the distance between the first, upstream sprinkler and the second, downstream sprinkler. The L-dimension can be determined by measuring the perpendicular distance (relative a flow path defined by a first branch of sprinklers) between a first sprinkler located on the first branch and a second sprinkler located on a second branch, measuring the perpendicular distance (relative the flow path defined by the first branch of sprinklers) between a sprinkler located on a branch proximate a wall or obstruction and the wall or obstruction, and defining the value of the L-dimension as the larger of either twice the distance of the sprinkler located on a branch proximate a wall or obstruction and the wall or obstruction or distance between the first sprinkler located on the first branch and the second sprinkler located on the second branch.

The polygonal spray pattern can be defined by collecting water in four pans in twelve positions located 8 feet below the sprinkler 108. The pans each define a 1 square foot square cross section and are 1 foot deep. The flow rate of water fed to the sprinkler 108 is at least 0.1 $GPM/ft^{1/2}$. In arrangements in which the sprinkler 108 has an operating pressure of 175 psi or more, the pressure of water fed to the sprinkler 108 is 75 psi less than the operating pressure.

Figure 3:
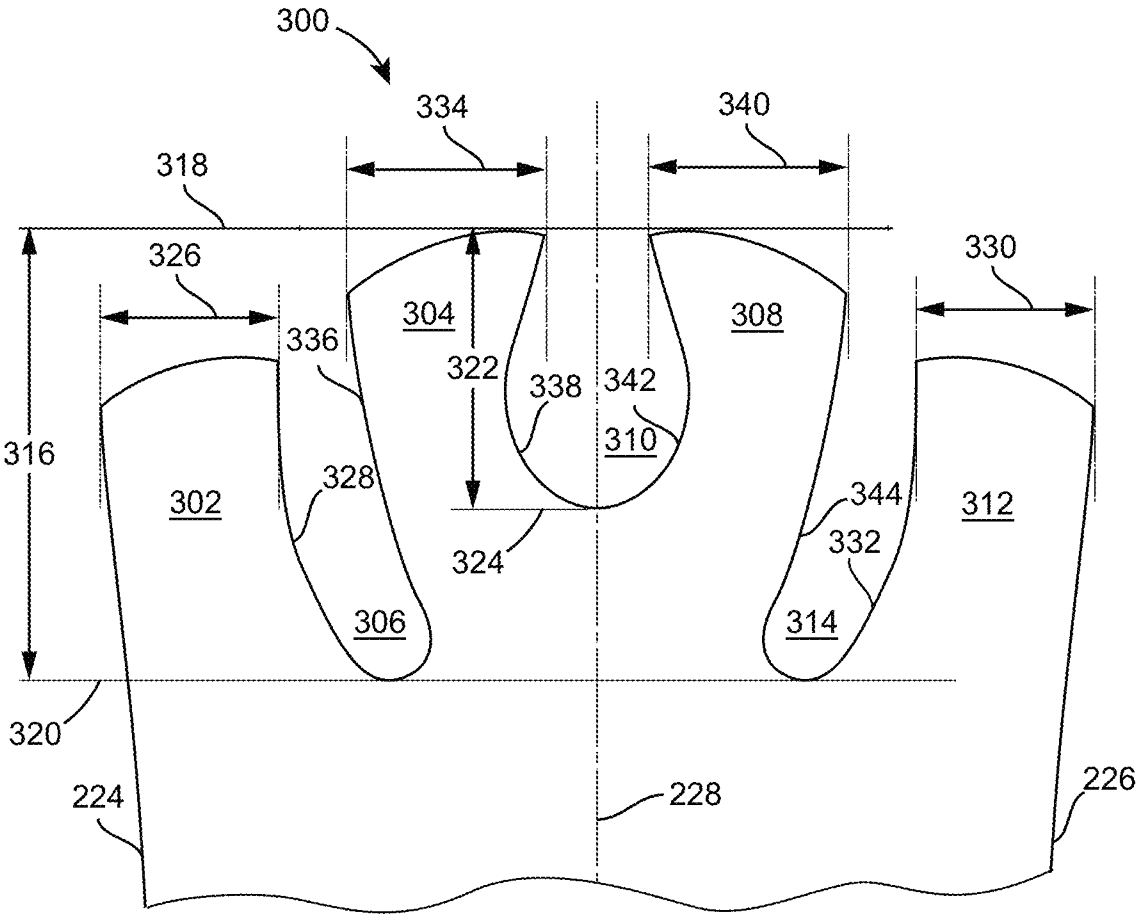
FIG. 3 is a schematic diagram depicting a deflector end profile.

FIG. 3 depicts an end profile 300 of the deflector 218. The end profile 300 can be defined by each of the first side 220 and the second side 222. The end profile 300 can be defined by each of the first side 220 and the second side 222. End profile 300 can define multiple tines, such as a first tine 302 separated from a second tine 304 by a first slot 306, a third tine 308 separated from the second tine 304 by a second slot 310, and a fourth tine 312 separated from the third tine 308 by a third slot 314. The first slot 306 and the third slot 314 can each define a first depth 316 that is measured from an outward-most extension 318 of the end profile 300 to an inward-most interior 320 of the end profile 300. The outward-most extension 318 can be the furthest-extending surface of end profile 300 relative to sprinkler axis 204 (e.g., a point on end profile 300 furthest from sprinkler axis 204).

Inward-most interior 320 can be a surface defining first slot 306 and third slot 314 that is nearest sprinkler axis 204.

The second slot 310 can define a second depth 322 that is measured from the outward-most extension 318 to a second slot interior 324. The second slot interior 324 can be a surface defining second slot 310 that is nearest sprinkler axis 204. The first depth 316 can be greater than the second depth 322. The first depth 316 can range in size from ten percent to forty percent of the total length of deflector 218, which can facilitate deflecting fire suppression material towards sides or corners of the corridor. The total length of deflector 218 can be measured from an outward-most extending point of first side 220 (e.g., outward-most extension 318) relative to sprinkler axis 204 to an outward-most extending portion of second side 222 relative to sprinkler axis 204. The first depth 316 can range in size from fifteen percent to thirty-five percent of the total length of deflector 218. The first depth 316 can range in size from twenty percent to thirty percent of the length of the deflector 218. The first depth 316 can have a size of twenty-five percent of the total length of deflector 218. The second depth 322 can range in size from five percent to twenty-five percent of the total length of deflector 218, which can facilitate deflecting fire suppression material down the length of the corridor. The second depth 322 can range in size from eight percent to twenty-three percent of the total length of deflector 218. The second depth 322 can range in size from ten percent to twenty percent of the total length of deflector 218. The second depth 322 can have a size of fifteen percent of the total length of deflector 218.

First tine 302 can define a first width 326 that is measured from an outward-most portion (relative deflector axis 228) of third side 224 to an outward-most portion (relative deflector axis 228) of a first exterior slot side 328. Fourth tine 312 can define a fourth width 330 that is measured from an outward-most portion (relative deflector axis 228) of fourth side 226 to an outward-most portion (relative deflector axis 228) of a third exterior slot side 332. The first width 326 and the fourth width 330 can be approximately the same size. The first width 326 and the fourth width can be different sizes. The first width 326 and the fourth width 330 can each range in size from 0.072 inches to 0.308 inches. The first width 326 and the fourth width 330 can each range in size from 0.100 inches to 0.225 inches. The first width 326 and the fourth width 330 can each range in size from 0.144 inches to 0.154 inches. The first width 326 and the fourth width 330 can each have a size of 0.149 inches.

Second tine 304 can define a second width 334 that is measured from an outward-most portion (relative deflector axis 228) of a first interior slot side 336 to a portion of a second slot side 338 proximate outward-most extension 318. Third tine 308 can define a third width 340 that is measured from a portion of a central slot side 342 proximate outward-most extension 318 to an outward-most portion (relative deflector axis 228) of a third interior slot side 344. The second width 334 and the third with 340 can be approximately the same size. The second width 334 and the third width 340 can be different sizes. The second width 334 and the third width 340 can each range in size from 0.072 inches to 0.308 inches. The second width 334 and the third width 340 can each range in size from 0.100 inches to 0.225 inches. The second width 334 and the third width 340 can each range in size from 0.160 inches to 0.170 inches. The second width 334 and the third width 340 can each have a size of 0.1645 inches.

Figure 4:
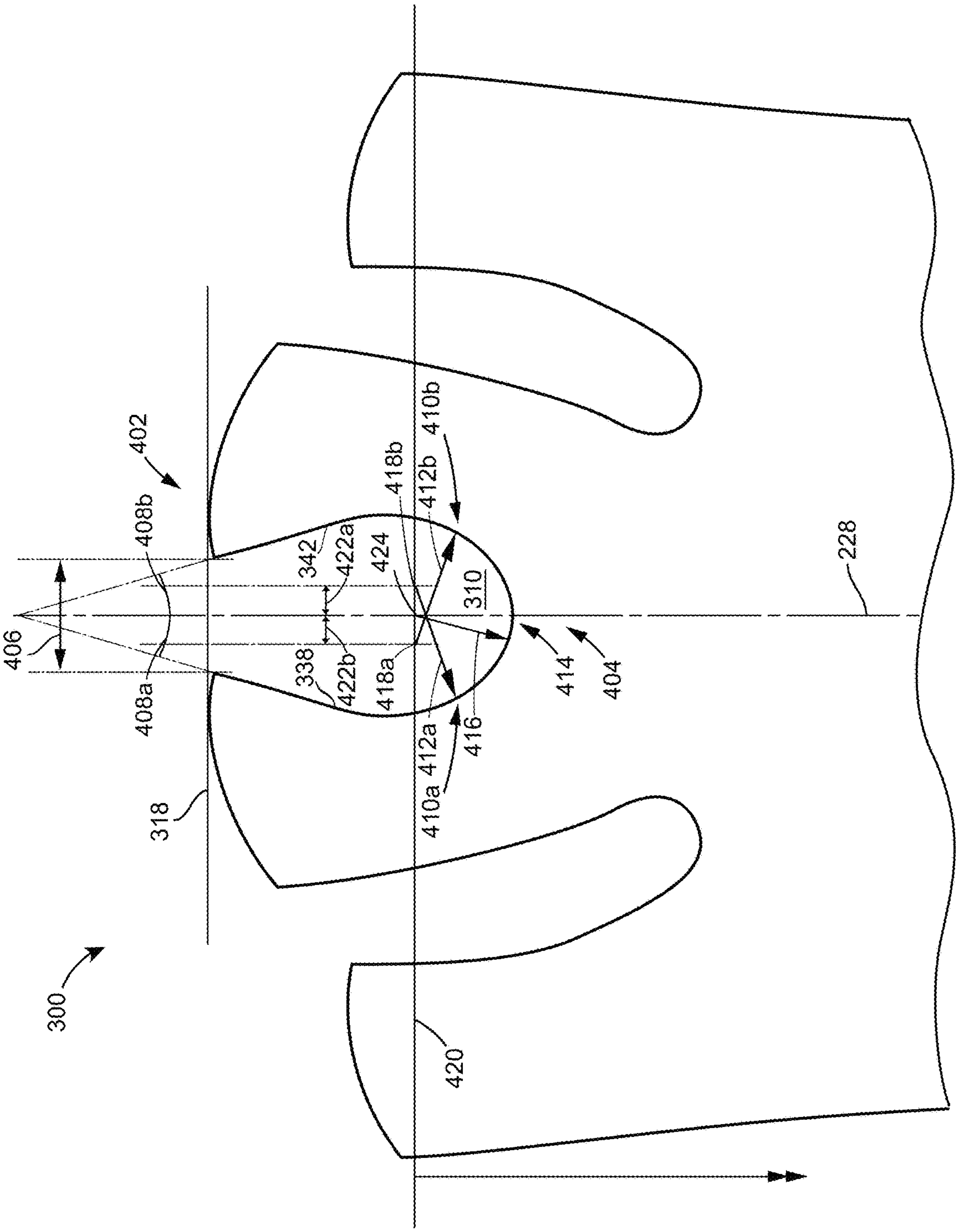
FIG. 4 is a schematic diagram depicting a deflector end profile.

FIG. 4 depicts features of the end profile 300 including second slot 310. Second slot 310 extends from an exterior end 402 that is proximate outward-most extension 318 to an interior end 404 that is furthest outward-most extension 318. The interior end 404 can be defined by a point at which the second slot side 338 and the central slot side 342 connect. Such a point can be located along deflector axis 228. Second slot 310 defines a second slot width 406 measured from a portion of second slot side 338 proximate outward-most extension 318 to a portion of a central slot side 342 proximate outward-most extension 318. The second slot width 406 can range in size from 0.04 inches to 2 inches. The second slot width 406 can range in size from 0.06 inches to 1.5 inches. The second slot width 406 can range in size from 0.085 inches to 0.095 inches. The second slot width 406 can be 0.090 inches. The point at which the second slot side 338 and the central slot side 342 connect may define a minimum value of second slot width 406. The second slot width 406 may not remain constant as second slot 310 extends between the exterior end 402 and the interior end 404. For example, second slot width 406 may have a first value defined at the portion of second slot 310 proximate exterior end 402, increase to a second value that is larger than the first value and located between the exterior end 402 and the interior end 404, and decrease to a minimum value at a point at which central slot side 342 and second slot side 338 conjoin.

The second slot side 338 and the central slot side 342 can each extend towards the deflector axis 228 as second slot 310 extends from a point between exterior end 402 and interior end 404 towards exterior end 402. The second slot side 338 and the central slot side 342 can extend towards the deflector axis 228 linearly, each defining a linear portion of the second slot side 338 and the central slot side 342. The linear portion of the second slot side 338 and the linear portion of the central slot side 342 can define a first angle 408*a* and a second angle 408*b*, respectively. The first angle 408*a* is measured between the second slot side 338 and the deflector axis 228. The second angle 408*b* is measured between the central slot side 342 and the deflector axis 228. The first angle 408*a* and the second angle 408*b* can each range between a first value of 7 degrees and a second value of 33 degrees. The first angle 408*a* and the second angle 408*b* can each range between a first value of 10 degrees and a second value of 24 degrees. The first angle 408*a* and the second angle 408*b* can each range between a first value of 14.4 degrees and a second value of 16.4 degrees. The first angle 408*a* and the second angle 408*b* can each have a value of 15.4 degrees.

The portions of the second slot side 338 and the central slot side 342 that are not defined by the linear portions can each define a curvilinear portion. The curvilinear portions for each of the second slot side 338 and the central slot side 342 can extend from the interior end 404 towards a point located between the interior end 404 and the exterior end 402. The curvilinear portions for each of the second slot side 338 and the central slot side 348 can each define a radius. The radius defined by the curvilinear portions for each of the second slot side 338 and the central slot side 348 may not be constant as the curvilinear portions for each of the second slot side 338 and the central slot side 342 extend from the interior end 404 towards a point located between the interior end 404 and the exterior end 402. The curvilinear portions for each of the second slot side 338 and the central slot side 348 respectively include a first curvilinear portion 410*a* and a second curvilinear portion 410*b* respectively defining a first radius 412*a* and a second radius 412*b*. The curvilinear portions for each of the second slot side 338 and the central slot side 348 also include a third curvilinear portion 414 defining a third radius 416. The third curvilinear portion 414 can be located proximate interior end 404 and define an inner-most portion of the second slot 310 that is furthest exterior end 402. The first curvilinear portion 410*a* and the second curvilinear portion 410*b* can each respectively extend from the linear portions of the second slot side 338 and the central slot side 348 towards the third curvilinear portion 414.

The first radius 412*a* can be measured from a first slot point 418*a* to the first curvilinear portion 410*a*. The first slot point 418*a* can be located at an intersection of a vertical offset 420 and a first horizontal offset 422*a*. The second radius 412*b* can be measured from a second slot point 418*b* to the second curvilinear portion 410*b*. The second slot point 418*b* can be located at an intersection of vertical offset 420 and a second horizontal offset 422*b*. The vertical offset 420 can be perpendicular to deflector axis 228 and can be located at a distance measured outwards from sprinkler axis 204. The vertical offset 420 can be located at a distance ranging between a first value of 0.300 inches and a second value of 1.30 inches. The vertical offset 420 can be located at a distance ranging between a first value of 0.450 inches and a second value of 1.000 inch. The vertical offset 420 can be located at a distance ranging between a first value of 0.649 inches and a second value of 0.659 inches. The vertical offset 420 can be at a distance of 0.654 inches. First horizontal offset 422*a* can be parallel to deflector axis 228 and can be located at a distance measured outwards from deflector axis 228 in a direction towards central slot side 342. Second horizontal offset 422*b* can be parallel to deflector axis 228 and can be located at a distance measure outwards from deflector axis 228 in a direction towards second slot side 338. First horizontal offset 422*a* and second horizontal offset 422*b* can each be located at a distance ranging between a first value of 0.007 inches and a second value of 0.050 inches. First horizontal offset 422*a* and second horizontal offset 422*b* can each be located at a distance ranging between a first value of 0.010 inches and a second value of 0.040 inches. First horizontal offset 422*a* and second horizontal offset 422*b* can each be located at a distance ranging between a first value of 0.014 inches and a second value of 0.024 inches. First horizontal offset 422*a* and second horizontal offset 422*b* can each be located at a distance of 0.019 inches.

First radius 412*a* and second radius 412*b* can each range between a first value of 0.045 inches and a second value of 0.200 inches. First radius 412*a* and second radius 412*b* can each range between a first value of 0.070 inches and a second value of 0.150 inches. First radius 412*a* and second radius 412*b* can each range between a first value of 0.092 inches and a second value of 0.102 inches. First radius 412*a* and second radius 412*b* can each have a value of 0.097 inches.

Third radius 416 can be measured from a third slot point 424 to the third curvilinear portion 414. The third slot point 424 can be located at an intersection of deflector axis 228 and vertical offset 420. Third radius 416 can range between a first value of 0.010 inches and a second value of 0.070 inches. Third radius 416 can range between a first value of 0.018 inches and a second value of 0.050 inches. Third radius 416 can range between a first value of 0.026 inches and a second value of 0.036 inches. Third radius 416 can have a value of about 0.031 inches.

Figure 5:
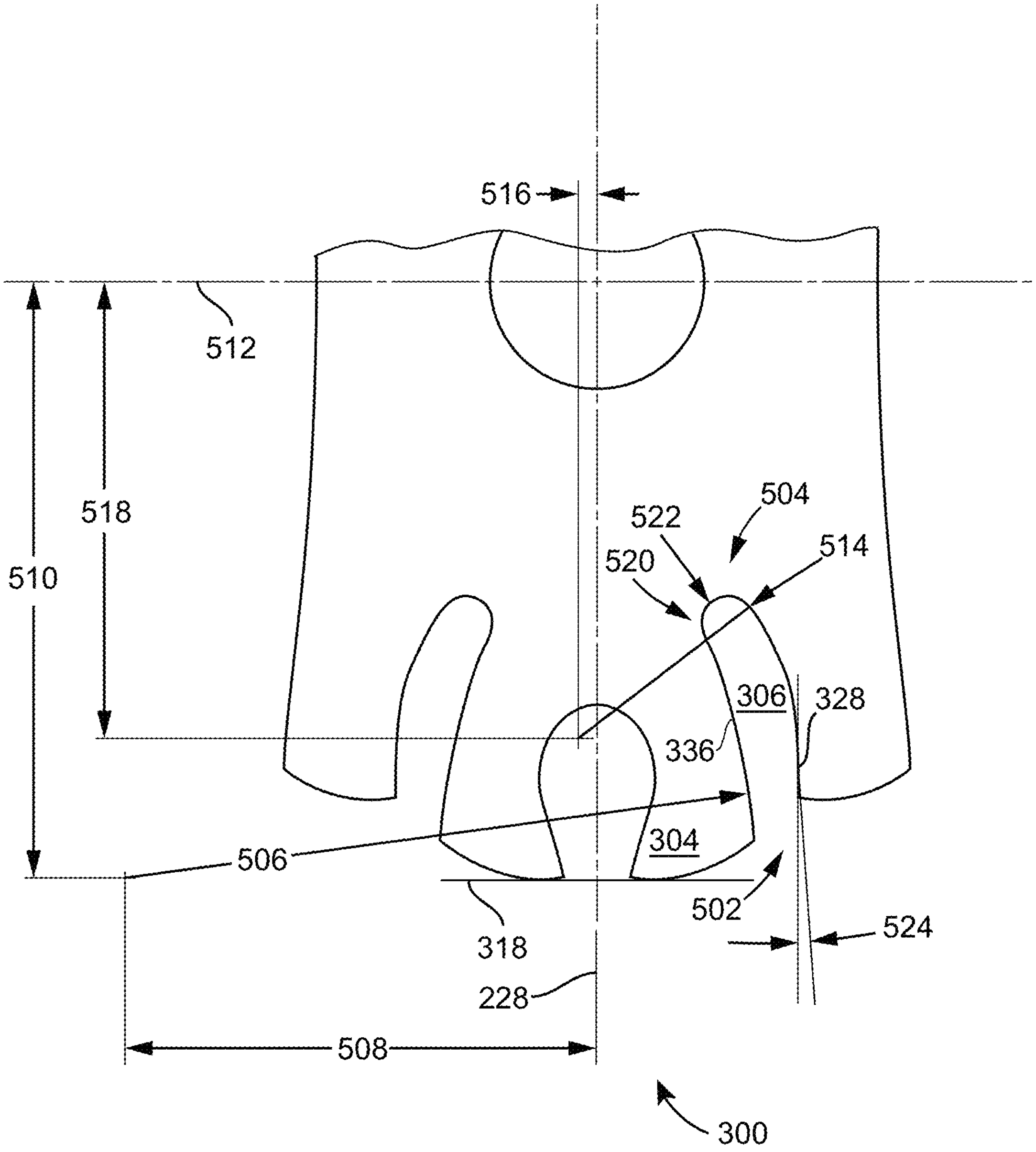
FIG. 5 is a schematic diagram depicting a deflector end profile.

FIG. 5 depicts features of end profile 300 including first slot 306. The third slot 314 may incorporate features of first slot 306, including dimensions or relative dimensions. First slot 306 extends from an exterior end 502 that is proximate outward-most extension 318 to an interior end 504 that is furthest outward-most extension 318. The interior end 504 can be defined by a point at which the first exterior slot side 328 and the first interior slot side 336 connect. The point at which the first exterior slot side 328 and the first interior slot side 336 connect can define a point of first slot 306 that is proximate sprinkler axis 204.

First interior slot side 336 defines an outwardly-extending (relative deflector axis 228) curvilinear portion that extends from exterior end 502 towards a point located between exterior end 502 and interior end 504. The outwardly-extending curvilinear portion of first interior slot side 336 defines a first radius 506 that is measured from an intersection of a first horizontal offset 508 and a first vertical offset 510. First horizontal offset 508 extends from deflector axis 228 in a direction away from first slot 306. A length of first horizontal offset 508 can range between a first value of 0.250 inches and a second value of 1.200 inches. A length of first horizontal offset 508 can range between a first value of 0.400 inches and a second value of 0.90 inches. A length of first horizontal offset 508 can range between a first value of 0.585 inches and a second value of 0.595 inches. A length of first horizontal offset 508 can have a value of 0.590 inches. First vertical offset 510 can be perpendicular to deflector axis 228 and can be located at a distance measured from a horizontal centerline 512 that intersects sprinkler axis 204. The first vertical offset 510 can be located at a distance ranging between a first value of 0.350 inches and a second value of 1.400 inches. The first vertical offset 510 can be located at a distance ranging between a first value of 0.500 inches and a second value of 1.000 inches. The first vertical offset 510 can be located at a distance ranging between a first value of 0.777 inches and a second value of 0.787 inches. The first vertical offset 510 can be located at a distance of 0.782 inches. First radius 506 can range between a first value of 0.350 inches and a second value of 1.6 inches. First radius 506 can range between a first value of 0.500 inches and a second value of 1.300 inches. First radius 506 can range between a first value of 0.793 inches and a second value of 0.803 inches. First radius 506 can have a value of 0.798 inches.

First exterior slot side 328 defines an outwardly-extending (relative deflector axis 228) curvilinear portion that extends from exterior end 502 towards a point located between exterior end 502 and interior end 504. The outwardly-extending curvilinear portion of first exterior slot side 328 defines a second radius 514 that is measured from an intersection of a second horizontal offset 516 and a second vertical offset 518. Second horizontal offset 516 extends from deflector axis 228 in a direction away from first slot 306. A length of second horizontal offset 516 can range between a first value of 0.005 inches and a second value of 0.040 inches. A length of second horizontal offset 516 can range between a first value of 0.0075 inches and a second value of 0.030 inches. A length of second horizontal offset 516 can range between a first value of 0.010 inches and a second value of 0.020 inches. A length of second horizontal offset 516 can be 0.015 inches. Second vertical offset 518 can be perpendicular to deflector axis 228 and can be located at a distance measured from horizontal centerline 512 that intersects sprinkler axis 204. The second vertical offset 518 can be located at a distance ranging between a first value of 0.300 inches and a second value of 1.22 inches. The second vertical offset 518 can be located at a distance ranging between a first value of 0.400 inches and a second value of 1.000 inches. The second vertical offset 518 can be located at a distance ranging between a first value of 0.600 inches and a second value of 0.610 inches. The second vertical offset 518 can be located at a distance of 0.605 inches. Second radius 514 can range between a first value of 0.100 inches and a second value of 0.600 inches. Second radius 514 can range between a first value of 0.200 inches and a second value of 0.450 inches. Second radius 514 can range between a first value of 0.274 inches and a second value of 0.284 inches. Second radius 514 can have a value of 0.279.

First exterior slot side 328 and first interior slot side 336 are depicted to define an interior end curvature 520 having a third radius 522. The interior end curvature 520 is defined by a portion of first interior slot side 336 extending from a point located between exterior end 502 and interior end 504 to the point at which the first exterior slot side 328 and the first interior slot side 336 connect (e.g., defining interior end 504) that is proximate sprinkler axis 204 and a portion of first exterior slot side 328 extending from a point located between exterior end 502 and interior end 504 to the point at which the first exterior slot side 328 and the first interior slot side 336 connect. The third radius 522 can range between a first value of 0.100 inches and a second value of 0.600 inches. The third radius 522 can range between a first value of 0.150 inches and a second value of 0.500 inches. The third radius 522 can range between a first value of 0.274 inches and a second value of 0.284 inches. The third radius 522 can have a value of 0.279 inches.

First exterior slot side 328 is depicted to define a first endpoint angle 524. The first endpoint angle 524 defines a curvature angle of the first exterior slot side 328 measured relative to deflector axis 228 and from a point on first exterior slot side 328 that is furthest from horizontal centerline 512. The first endpoint angle 524 can range between a first value of 1.25 degrees and a second value of 9 degrees. The first endpoint angle 524 can range between a first value of 1.75 degrees and a second value of 7 degrees. The first endpoint angle 524 can range between a first value of 2.5 degrees and a second value of 4.5 degrees. The first endpoint angle 524 can have a value of 3.5 degrees.

Figure 6:
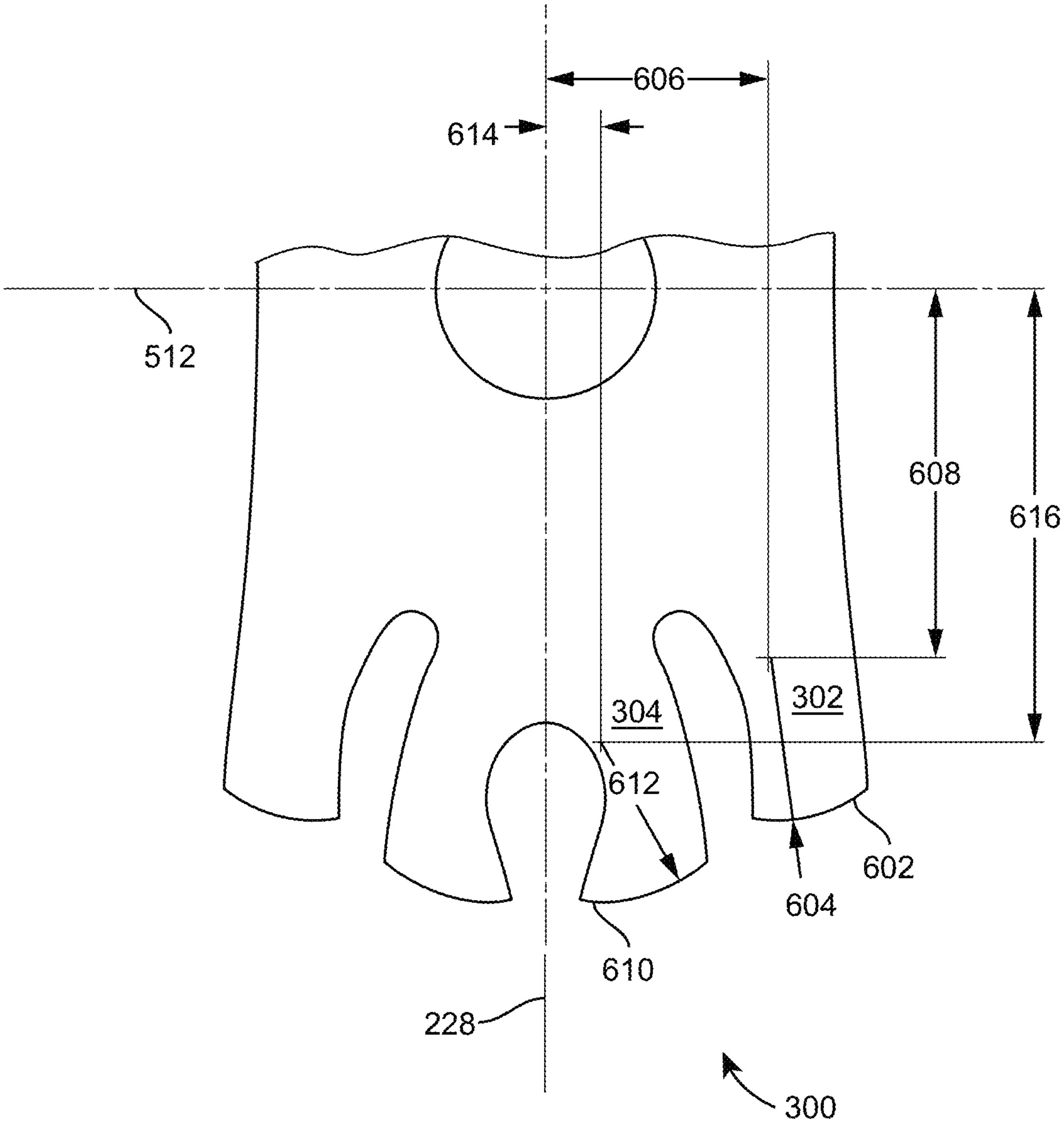
FIG. 6 is a schematic diagram depicting a deflector end profile.

FIG. 6 depicts features of end profile 300 including first tine 302 and second tine 304. The third tine 308 and fourth tine 312 may respectively incorporate features of first tine 302 and second tine 304, including dimensions or relative dimensions. First tine 302 is depicted to define an outermost edge 602. The outermost edge 602 defines a curvature having a fourth radius 604. Fourth radius 604 is measured from an intersection of a third horizontal offset 606 and a third vertical offset 608. Third horizontal offset 606 extends from deflector axis 228 in a direction towards first tine 302. A length of third horizontal offset 606 can range between a first value of 0.100 inches and a second value of 0.600 inches. A length of third horizontal offset 606 can range between a first value of 0.150 inches and a second a value of 0.500 inches. A length of third horizontal offset 606 can range between a first value of 0.289 inches and a second value of 0.299 inches. A length of third horizontal offset 606 can be 0.294 inches. Third vertical offset 608 can be perpendicular to deflector axis 228 and can be located at a distance measured from horizontal centerline 512 that intersects sprinkler axis 204. The third vertical offset 608 can be located at a distance ranging between a first value of 0.200 inches and a second value of 1.000 inches. The third vertical offset 608 can be located at a distance ranging between a first value of 0.300 inches and a second value of 0.800 inches. The third vertical offset 608 can be located at a distance ranging between a first value of 0.473 inches and a second value of 0.483 inches. The third vertical offset 608 can be located at a distance of 0.478 inches. Fourth radius 604 can range between a first value of 0.100 inches and a second value of 0.450 inches. Fourth radius 604 can range between a first value of 0.150 inches and a second value of 0.350 inches. Fourth radius 604 can range between a first value of 0.203 inches and a second value of 0.213 inches. Fourth radius 604 can have a value of 0.208 inches.

Second tine 304 is depicted to define a second outermost edge 610. The second outermost edge 610 defines a curvature having a fifth radius 612. Fifth radius 612 is measured from an intersection of a fourth horizontal offset 614 and a fourth vertical offset 616. Fourth horizontal offset 614 extends from deflector axis 228 in a direction towards first tine 302. A length of fourth horizontal offset 614 can range between a first value of 0.035 inches and a second value of 1.6 inches. A length of fourth horizontal offset 614 can range between a first value of 0.050 inches and a second value of 1.200 inches. A length of fourth horizontal offset 614 can range between a first value of 0.076 inches and a second value of 0.086 inches. A length of fourth horizontal offset 614 can be 0.081 inches. Fourth vertical offset 616 can be perpendicular to deflector axis 228 and can be located at a distance measured from horizontal centerline 512 that intersects sprinkler axis 204. The fourth vertical offset 616 can be located at a distance ranging between a first value of 0.250 inches and a second value of 1.200 inches. The fourth vertical offset 616 can be located at a distance ranging between a first value of 0.400 inches and a second value of 1.100 inches. The fourth vertical offset 616 can be located at a distance ranging between a first value of 0.580 inches and a second value of 0.590 inches. The fourth vertical offset 616 can be located at a distance of 0.585 inches. Fifth radius 612 can range between a first value of 0.100 inches and a second value of 0.400 inches. Fifth radius 612 can range between a first value of 0.150 inches and a second value of 0.300 inches. Fifth radius 612 can range between a first value of 0.201 inches and a second value of 0.211 inches. Fifth radius 612 can have a value of 0.206 inches.

Figure 7:
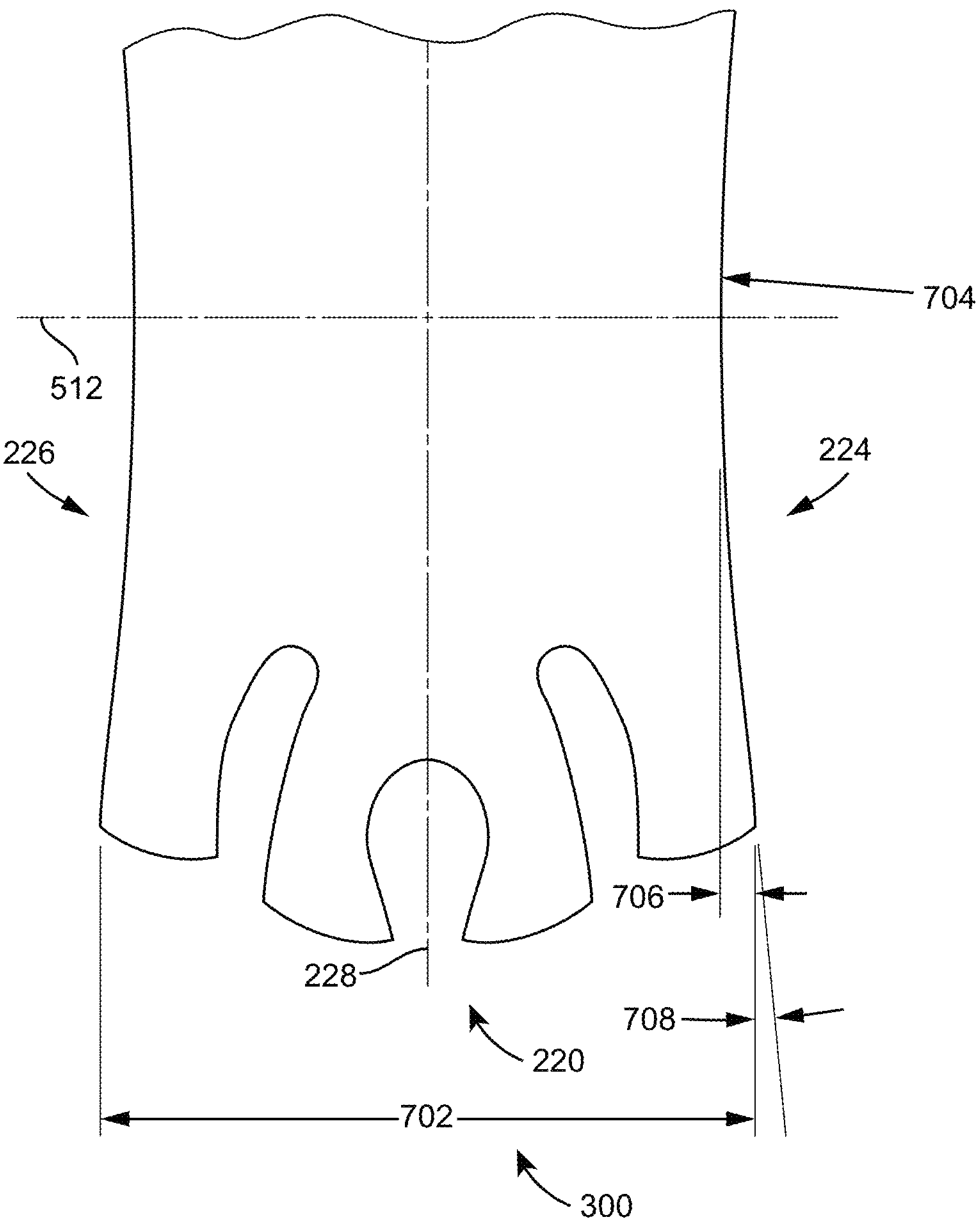
FIG. 7 is a schematic diagram depicting a deflector end profile.

FIG. 7 depicts features of end profile 300 including first side 220 and third side 224. Second side 222 and fourth side 226 can incorporate features of first side 220 and third side 224, respectively, including dimensions or relative dimensions. First side 220 is depicted to define a maximum width 702. In general, maximum width 702 is a maximum width measured between third side 224 and fourth side 226. More specifically, maximum width 702 is measured from a point of third side 224 that is located furthest away from deflector axis 228 to a point of fourth side 226 that is located furthest away from deflector axis 228. Maximum width 702 can range between a first value of 0.400 inches and a second value of 1.600 inches. Maximum width 702 can range between a first value of 0.600 inches and a second value of 1.200 inches. Maximum width 702 can range between a first value of 0.831 inches to a second value of 0.841 inches. Maximum width 702 can have a value of 0.836 inches.

Third side 224 defines a curvature extending from first side 220 to second side 222 and has a third side radius 704. The curvature defined by third side 224 can have an inner most point located along horizontal centerline 512 providing a point of third side 224 that is nearest deflector axis 228. The curvature defined by third side 224 can have an outermost point located proximate first end 214 providing a point of third side 224 that is furthest deflector axis 228. A curvature width 706 is measured between the innermost point of third side 224 and the outermost point of third side 224. The curvature width 706 can range between a first value of 0.020 inches and a second value of 0.100 inches. The curvature width 706 can range between a first value of 0.030 inches and a second value of 0.075 inches. The curvature width 706 can range between a first value of 0.041 inches and a second value of 0.052 inches. The curvature width 706 can be 0.046 inches. Third side radius 704 can range between a first value of 2.000 inches and a second value of 8.200 inches. Third side radius 704 can range between a first value of 3.00 inches and a second value of 6.000 inches. Third side radius 704 can range between a first value of 4.083 inches and a second value of 4.093 inches. Third side radius 704 can be 4.088 inches.

An endpoint angle 708 defines a curvature angle of the third side 224 relative deflector axis 228 at a point furthest away from horizontal centerline 512. The endpoint angle 708 can range between a first value of 2 degrees and a second value of 12 degrees. The endpoint angle 708 can range between a first value of 5 degrees and a second value of 9 degrees. The endpoint angle 708 can range between a first value of 4 degrees and a second value of 6 degrees. The endpoint angle 708 can have a value of 5 degrees.

Figure 8:
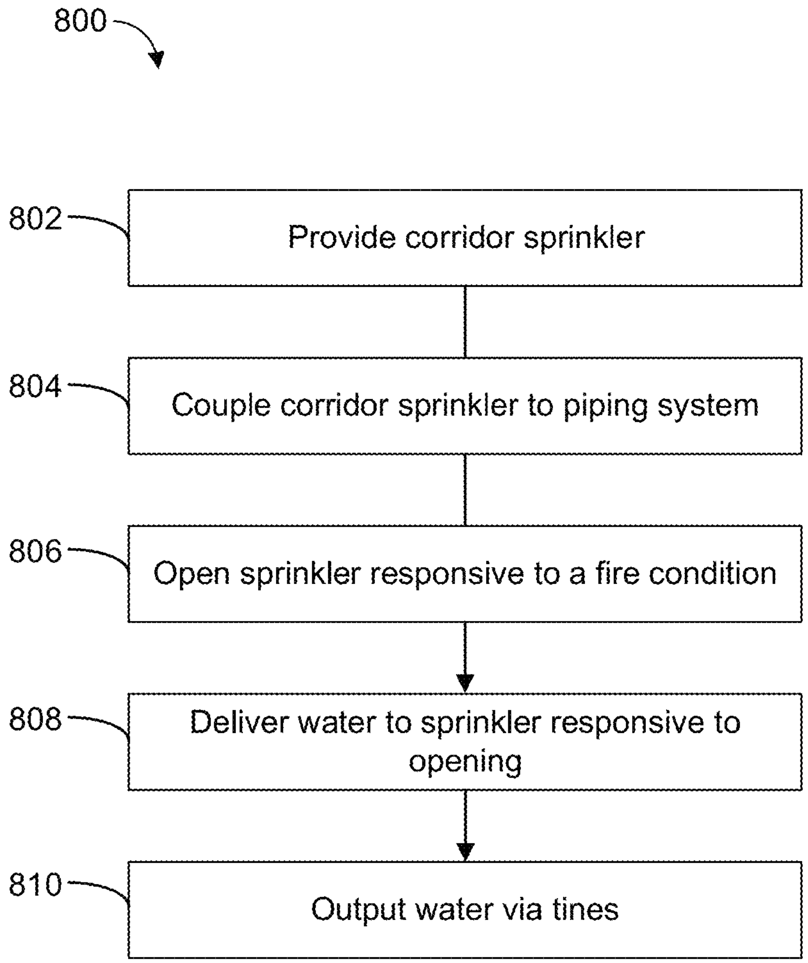
FIG. 8 is a flow diagram depicting a method of extinguishing a fire.

FIG. 8 depicts a method 800 for extinguishing a fire. The method 800 can be implemented using various devices and systems described herein, such as the fire suppression system 100 including The sprinkler 108.

At 802, a sprinkler (e.g., corridor sprinkler) can be provided. A corridor sprinkler can include a sprinkler frame that defines a channel extending along a sprinkler axis. The sprinkler frame can include an outside structure for coupling the corridor sprinkler to a fire suppression material supply pipe. The outside structure can be, for example, a threaded structure that engages with a correspondingly threaded structure. The corridor sprinkler can include a mount that extends outwards from the sprinkler axis from a first end coupled with the sprinkler frame to a second end. The corridor sprinkler can include a deflector coupled with the second end of the mount. The deflector can include a first side, a second side, a third side, and a fourth side. The first side and the second side can be smaller than the third side and the fourth side. The first side and the second side can each include an end profile defining a first tine separated from a second tine by a first slot, a third tine separated from the second tine by a second slot, and a fourth tine separated from the third tine by a third slot. A first depth of the first slot can be greater than a second depth of the second slot.

At 804, the corridor sprinkler can be coupled with a piping system. The corridor sprinkler can be coupled with the piping system using an engagement structure provided by the sprinkler frame of the corridor sprinkler. The engagement structure can be a threaded structure that engages a corresponding threaded structure provided by the piping system. The corridor sprinkler can be coupled with the piping system by twisting the corridor sprinkler relative the sprinkler axis so that the threaded structure provided by the corridor sprinkler engages with the corresponding threaded structure of the piping system.

At 806, the sprinkler can be opened responsive to a fire condition. Opening a sprinkler can include activating a thermally-responsive trigger that activates at a predetermined temperature. The predetermined temperature can be 155° F. The predetermined temperature can be 200° F. Opening a sprinkler can include determining a control command responsive to the fire condition. The control command can command the corridor sprinkler to open at the fire condition. The control command can be determined by a fire safety control system or a building management system. The fire condition can include a threshold temperature, a threshold amount of smoke in the air, etc.

At 808, water can be delivered to the sprinkler responsive to the sprinkler opening. The water can be a delivered from a fire suppression material source (e.g., a tank) that stores fire suppression material (e.g., water) to the sprinkler via the piping system.

At 810, water can be outputted from the sprinkler via tines provided by the deflector. The water can be outputted by the tines by receiving the water from the piping system, transmitting the water through the channel of the sprinkler frame, outputting the water from the channel via an outlet. The water can strike the deflector and develop a spray pattern. Water that strikes the first tine and the fourth tine of the deflector can develop a spray pattern directed towards two corners of a room. Water that strikes the second tine and the third tine can develop a spray pattern directed towards a wall between the two corners of the room.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A fire protection sprinkler, comprising:

a frame defining a passageway between an inlet and an outlet along a longitudinal axis, the passageway having a nominal K-factor greater than or equal to 8.0;

a seal coupled with the outlet to prevent fluid flow out of the passageway while the seal is in an unactuated state;

a thermally-responsive trigger that changes the seal from the unactuated state to an actuated state to allow fluid to flow out of the passageway; and a deflector coupled with the frame, the deflector to provide a coverage area of between 220 square feet and 400 square feet in a polygonal spray pattern having a long axis of between 28 feet and 36 feet, the deflector is planar and comprises a first side, a second side, a third side, and a fourth side, the deflector having a deflector axis extending through the first side and the second side and a horizontal centerline extending across the deflector axis from the third side to the fourth side, the deflector axis parallel with the long axis, the third side and the fourth side are tineless and each have a concave curvature from an innermost point at the horizontal centerline to an outermost point, the outermost point defining a curvature width from the outermost point to the deflector axis, the curvature width greater than or equal to 0.02 inches and less than or equal to 0.1 inches, the first side and the second side each comprise an end profile defining a plurality of tines, the first side and the second side have a length that is smaller than a length of the third side and the fourth side.

2. The fire protection sprinkler of claim 1, comprising:

the plurality of tines comprise a first tine separated from a second tine by a first slot, a third tine separated from the second tine by a second slot, and a fourth tine separated from the third tine by a third slot.

3. The fire protection sprinkler of claim 1, comprising:

the plurality of tines define a first slot having a first depth and a second slot having a second depth less than the first depth.

4. The fire protection sprinkler of claim 1, comprising:

the nominal K-factor is less than or equal to 26.0.

5. The fire protection sprinkler of claim 1, comprising:

a mount that extends outward of the longitudinal axis from a first end coupled with the frame to a second end coupled with the deflector.

6. The fire protection sprinkler of claim 1, comprising:

the thermally-responsive trigger comprises a glass bulb.

7. The fire protection sprinkler of claim 1, comprising:

the thermally-responsive trigger comprises a strut lever and solder link assembly.

8. The fire protection sprinkler of claim 1, comprising:

the thermally-responsive trigger has a thermal rating of 155 degrees Fahrenheit or 200 degrees Fahrenheit.

9. The fire protection sprinkler of claim 1, comprising:

a plurality of support arms coupled with the frame and the deflector.

10. The fire protection sprinkler of claim 1, comprising:

the seal comprises a sprinkler button.

11. A corridor sprinkler, comprising:

a frame having a passageway extending through the frame between an inlet and an outlet along a longitudinal axis;

a seal coupled with the outlet;

a thermally-responsive trigger that applies a force against the seal; and a deflector coupled with the frame, the deflector to provide a coverage area of between 220 square feet and 400 square feet in a polygonal spray pattern having a long axis of between 28 feet and 36 feet, the deflector is planar and comprises a first side, a second side, a third side, and a fourth side, the deflector having a deflector axis extending through the first side and the second side and a horizontal centerline extending across the deflector axis from the third side to the fourth side, the deflector axis parallel with the long axis, the third side and the fourth side are tineless and each have a concave curvature from an innermost point at the horizontal centerline to an outermost point, the outermost point defining a curvature width from the outermost point to the deflector axis, the curvature width greater than or equal to 0.02 inches and less than or equal to 0.1 inches, the first side and the second side each comprise an end profile defining a plurality of tines, the first side and the second side have a length that is smaller than a length of the third side and the fourth side.

12. The corridor sprinkler of claim 11, comprising:

the plurality of tines comprise a first tine separated from a second tine by a first slot, a third tine separated from the second tine by a second slot, and a fourth tine separated from the third tine by a third slot.

13. The corridor sprinkler of claim 11, comprising:

the plurality of tines define a first slot having a first depth and a second slot having a second depth less than the first depth.

14. The corridor sprinkler of claim 11, comprising:

the corridor sprinkler has a nominal K-factor greater than or equal to 8.0 and less than or equal to 26.0.

15. The corridor sprinkler of claim 11, comprising:

a mount that extends outward of the longitudinal axis from a first end coupled with the frame to a second end coupled with the deflector.

16. The corridor sprinkler of claim 11, comprising:

the thermally-responsive trigger has a thermal rating of 155 degrees Fahrenheit or 200 degrees Fahrenheit.

17. The corridor sprinkler of claim 11, comprising:

a plurality of support arms coupled with the frame and the deflector.

18. The corridor sprinkler of claim 11, comprising:

the seal comprises a sprinkler button.

19. The fire protection sprinkler of claim 1, comprising:

the third side and the fourth side have central portions that are curved inward towards the longitudinal axis.

20. The fire protection sprinkler of claim 1, comprising:

the plurality of tines of the first side include a first tine separated from a second tine by a first slot, the first slot has a first depth from an outermost portion of the first side, the deflector has a length from the outermost portion of the first side to an outermost portion of the second side, the first depth is greater than or equal to ten percent of and less than or equal to forty percent of the length.

* * * * *